Figure 1:
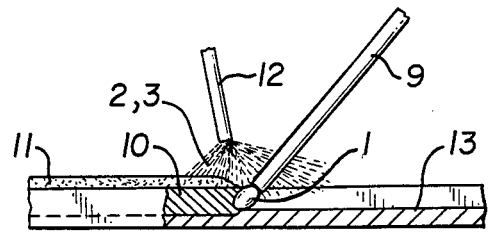

United States Patent [19]

Niinivaara

[11] Patent Number: 4,790,887
[45] Date of Patent: Dec. 13, 1988

[54] ADDITIVE FOR USE IN UNDERWATER ARC-WELDING

[75] Inventor: Ensi K. J. Niinivaara, Koria, Finland

[73] Assignee: GSS General Sea Safety Ltd., Helsinki, Finland

[21] Appl. No.: 44,849

[22] PCT Filed: Jul. 23, 1986

[86] PCT No.: PCT/FI86/00086
§ 371 Date: May 15, 1987
§ 102(e) Date: May 15, 1987

[87] PCT Pub. No.: WO87/00471
PCT Pub. Date: Jan. 29, 1987

[30] Foreign Application Priority Data

Jul. 24, 1985 [FI] Finland ................... 852877

[51] Int. Cl.$^4$ ............................................. B23K 35/34
[52] U.S. Cl. ........................................ 148/23; 148/26
[58] Field of Search ...................................... 148/23–26

[56] References Cited

U.S. PATENT DOCUMENTS

| 2,841,513 | 7/1958 | Morrison | 148/23 |
| 2,978,369 | 4/1961 | Battle | 148/23 |
| 3,436,278 | 4/1969 | Poliak | 148/23 |
| 4,180,616 | 12/1979 | Lovering | 148/23 |
| 4,220,486 | 9/1980 | Anderson | 148/26 |

Primary Examiner—Peter D. Rosenberg
Attorney, Agent, or Firm—Webb, Burden, Ziesenheim & Webb

[57] ABSTRACT

A pastelike additive used in the underwater arc welding to protect the weld and/or welding rod against the harmful effects of water. The additive contains the base material advantageously mixed with oily carrier liquid and comprising at least 10 percentages of weight one base material, advantageously a biomass with plenty of organic compounds, and possibly termitic agent, regulating agent for the pH-value of the additive, lighting agent, hydrogen removal agent and an agent to enhance the sufficiency. The additive according to the invention is characterized in that the ashless dry material of the biomass in the base material contains: 1 ... 40, advantageously 10 ... 13, percentages of weight amino acids; 0,5 ... 10, advantageously 1,5 ... 2,5, percentages of weight fatty acids; 50 ... 98, advantageously 83 ... 87, percentages of weight carbohydrates, preferably carbon compounds with large molecular sizes; and about 0,5 percentages of weight mineral substances and/or trace elements.

11 Claims, 1 Drawing Sheet

ADDITIVE FOR USE IN UNDERWATER ARC-WELDING

This invention relates to the additive according to the preamble of the claim 1 being adaptable for use especially in underwater arc welding.

Enterprises making welding works and manufacturing welding devices and equipment have strived to produce an arc welding method and equipment, by which the welding process and the end result would not be affected by outer conditions. It is well-known in the art that arc weldilng—particularly in good conditions very easy-to-use protective arc welding—cannot succesfully be performed in windy, draughty, rainy and/or wet surroundings let alone underwater conditions.

Underwater welding has in recent years been an object of ever-increasing interest and development work. Repairs and servicing of drilling platforms, particularly their underwater supporting structures and gas and/or oil pipes, ships and dock structures and equipment are the objects, in which underwater welding has primarily been used. The structures to be welded are generally such, that their lifting to the water surface is impossible or becomes very costly. The objective in underwater welding, as well as in welding generally, is and always will be the achievement of the highest quality welds.

The known methods for underwater welding are divided on grounds of the welding conditions into two main groups: wet methods and dry methods. In the known wet methods in the rod welding mainly usual welding rods are used coated by water-tight vinyl paint or paraffin to prevent wetting, and in gas arc welding besides the conventional equipment also a welding device, in which a from the outer perimeter of the nozzle directed conical water jet keeps the arc area separated from the water. Water jet has been used with relatively good results in the carbon dioxide wet method. In wet methods water may come, as even the name implies, unhindered to the arc area. In the dry methods the access of water to the arc area is prevented by covering the arc area with an essentially closed (weldable seam is naturally free) or at the lower end open opaque or transparent welding shield. The welding device is brought to the welding shields open at their lower end usually from below or to the entirely closed welding shields through the wall. If the welding shield is sufficiently large, the welder may work inside the shield. The welding shields are provided with either a protective gas or air atmosphere.

In underwater welding the welds of almost the same quality are achieved as in welding performed in favourable conditions above the ground level. The drawbacks in dry methods are, however, the time-consuming mountings and transfers of welding shields and also the inconvenience and inflexibility of the welding work due to the use of shields. There are also many places, where the use of welding shield is impossible. Wet welding, to which the present invention is particularly connected, is a rather flexible and economic system for underwater welding works. It can, if the welding is performed manually, be carried out except the diving equipment by the same devices as welding above the groun level. The weld quality in wet methods has not been even nearly as good as in the dry welding methods. Mainly because of this fact various classification institutions have not accepted the use of wet methods in the objects under their inspection. Three problems appear in the wet welding and all of them are caused by the surrounding water. They comprise a high cooling rate, high hydrogen content and the ambient pressure influencing to the reactions in the arc and also to the transfer of material as well as to the reactions between the melt and the slag especially in deeper depths.

The worst problem in wet methods is the appearance of hydrogen cracks. It is expressly caused by the large amount of hydrogen in the welding seam. High cooling rate makes further diffusion of water more difficult from the welding seam, and pre- or afterheatings cannot be used in practice to remove the hydrogen, to reduce strains or to avoid fragile microstructure. As a result of the high cooling rate a mostly easily brittling and great inner tensions comprising microstructure is produced in structural steels.

Another significant problem in wet methods is the poor impact strength of the welding seam. Ambient pressure, especially in greater depths, changes the conditions of slag reactions, and swift cooling does not give kinetic preconditions for sufficient cleaning of the welding material.

Particularly in rod welding the avoidance of welding faults, such as slag enclosures in pores, slag line and joint or root faults by wet methods calls for special professional skill in difficult conditions.

The above-mentioned problems connected with wet welding have been tried to solve heretofore by different protective substances applied to the weldable object, but not with even satisfactory results.

These previously known substances are among other things the paste according to the FI Patent No. 800248 consisting of the base material, such as soap, pine soap or equivalent and mixed with an electrically conductive fine powder; protective paste according to the FI Patent No. 67188 comprising a base material mixed with glycerine and including 40–50 percentages by weight oil acid and 1–40 percentages by weight linoleic acid, and possibly a lighting or illuminating agent and a hydrogen removal agent, which are for example magnesium as a lighting and hydrogen removal agent, iron oxide as a hydrogen removal agent or amorphous phosphorus as a lighting agent; the fast or semifast pastelike agent according to the FI Patents No. 780282 and 780283, which as at least partially dissolved in water forms an electrolyte and contains metal, non-metal etc. salt of an organic or inorganic acid, advantageously alkali salts of fat acids, soap or soft soap.

The objective of the present invention is to eliminate the above-mentioned disadvantages essential to the wet welding and their consequences better than before and to achieve a new additive suitable to be used especially for arc welding performed in water. This objective has been attained by the additive according to the invention, which is characterized by the characteristic features mentioned in the appended claims.

By the additive to be introduced to the arc area it is strived to facilitate the controlled burning of the arc, enhance the weld melt, delay the cooling of the weld and limit the direct presence of water in the arc area and also in the contact to the weld melt.

Because of the additive according to the invention the ignition of the arc takes place easier and the arc is stabilized. It forms a protective gas zone to the arc area to prevent the access of water to the arc and/or melt. Such a protective gas zone is formed especially when substances of organic origin are used. Moreover the additive forms a hard slag layer protecting the melt against the influence of water, when there is so much additive that it cannot be burned in the arc. The slag layer delays also cooling of the weld, so that the separation of gases from the weld becomes more effective. Because of the delayed cooling it is possible to make the weld shape and quality as suitable. The additive influences also to the melting rate and penetration, which are improved especially when substances of organic origin are used, which when burning in the arc develop a remarkable amount of thermal energy.

Reasons for the excellent function of the additive according to the invention in underwater welding are not fully known. The other factor delaying the weld cooling besides the side effect of the additive may be caused by the electric side currents generated because of the used additive between the whole weldable object and the rod heating the object, the water in vicinity of it and the seam with additional slag and slag layers thereof. The weld remains hot longer, whereby the removal of hydrogen brittling the weld becomes more effective and the weld is made stronger than before.

The additive according to the invention fits for use in all arc and gas arc welding applications, such as rod welding, MIG—, MAG—, TIG—, arcatome and plasm welding. The equipment and methods naturally vary depending on the welding performance.

In the following mainly the underwater welding is described, because the problems in the arc welding performed in water are at the present the greatest. By the use of the additive according to the invention it is however possible to perform arc welding also in different outer conditions, e.g. in connection with the arc welding above the ground level. In this case the additive according to the invention prevents besides the water the harmful effect of air to the weld. When the additive according to the invention is used in circumstances above the ground level for arc welding, more combustion gases are formed than in the underwater welding. The invention is thus based on the arrangement in which the conventional protective gas or coating of the welding rod has been replaced by the additive, the purpose of which is to stabilize the burning in the arc, facilitate the ionization of the arc area and protect both the arc and the produced weld against the harmful effects of environmental conditions. The additive according to the invention fits for use in connection with arc weldings performed both under water and above the ground level protecting the arc and the weld. A substantial advantage of the invention is also the possibility, that by changing the material contents of the additive it can be adjusted as a basic or acid substance, so that it always fits for the environmental conditions.

The methods of use of the additive according to the invention are now described with reference to the accompanying drawing.

In FIG. 1 the arc 1 is formed between the welding rod 9 and the base material 13. At the same time the welding rod 9 melts and forms the weld seam 10, which is melted fast to the base material 13. When the weld 10 is formed a slag layer 11 is generated from the coating of the welding rod 9 on the weld. The additive 2 according to the invention is introduced to the arc area 1.

Figure 2:
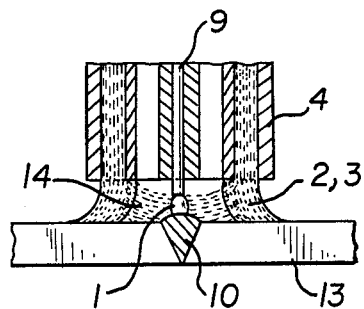

In the application of FIG. 2 the additive according to the invention is introduced to the arc area 1 from an annular nozzle 4 surrounding the arc and the welding rod 9. This arrangement resembles the protective arc welding (MIG, TIG, MAG). The only difference is that instead of the protective gas now the additive according to the invention is used, which has advantageous pastelike properties. The additional use of the protective gas is, of course, possible.

Figure 3:
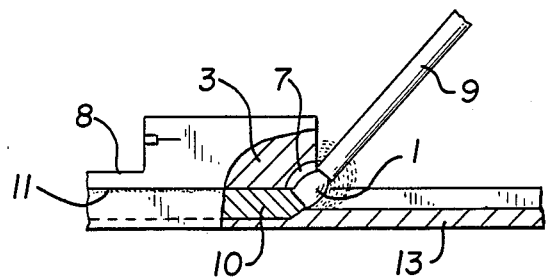

In FIG. 3 has been shown an application, in which the arc area formed between the welding rod 9 and base material 13 is partly protected by the additive according to the invention. Welding takes place under water and water surrounds the welding object. When welding is progressing the additive 3 is carried behind the arc and the weld is produced, when the arc burns in the cavity 7 formed in the additive 3. Also a protective layer 8 is separated from the additive 3 on the weld 10 protecting the latter. This protective layer 8 prevents cooling of the weld seam and also the access of water to contact the weld seam 10. Moreover the additive 3 when it remains on the hot weld seam 10 burns further on because of the organic substance in it even after the direct influence of the arc, which prevents continuously and effectively the excessively rapid cooling of the weld.

Figure 4:
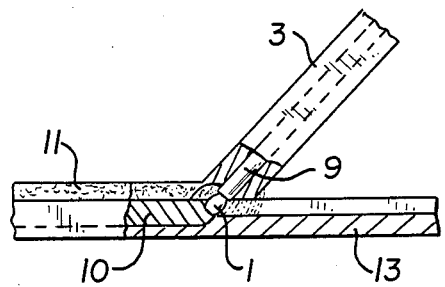

In FIG. 4 is shown a welding rod 9 for the adaptation of the invention. In this case a usual, coated or uncoated welding rod 9 is coated with additive 3 according to the invention. The cavity 7 may naturally also be closed by the additive from the side of the open seam, whereby the arc is in an essentially closed space. In this connection it is also advisable to take into account an advantageous application of the additive according to the invention, the pastelike additive can namely be applied in advance on the weldable object, in which case welding is performed by a usual welding rod by pushing the welding rod or wire simply through the additive layer and drawing it along the desired weldable joint to produce the weld.

The following exemplary performances are intended to illustrate the additive according to the invention.

In a preferable application of the invention the pastelike additive consists of the base material, advantageously mixed with the oily carrier liquid and comprising:

at least 10 percentages of weight at least one, advantageously plenty of organic compounds containing biomass, the ashless dry content of which is:

1 ... 40, preferably 10 ... 13, percentages of weight amino acids, 0,5 ... 10, preferably 1,5 ... 2,5, percentages of weight fatty acids, 50 ... 98, preferably 83 ... 87, percentages of weight carbohydrates, preferably carbon compounds with large molecule sizes, and about 0,5 percentages of weight mineral substances and trace elements. The most suitable biomass materials are the ones, the amino acid composition of which does not contain glyadine or glutenin, which together with water form gluten.

When the additive burns because of the arc it forms a protective hard slag layer on the weld. The additive can also contain several other additives, such as regulating agent for the pH-value of the additive lighting or illuminating agent hydrogen removal agent agent enhancing the sufficiency, and thermitic agent or an agent promoting the burning As a regulating agent for the PH-value can be used acid, or inextinguishable, lime or chalk powder and also usual lime, whereby their amount is depending on the desired acidity or alkalinity 10 ... 40 percentages of weight, for underwater use preferably 24 percentages, the portion of the usual lime being then about 10 percentages of weight. Moreover it is possible to use in the additive as an extra binding agent a proper commercially generally obtainable glue, e.g. rubber glue.

In the performed test concerning the additive according to the invention the welding was made in underwater conditions about 2 m below the water surface, whereby visibility was still relatively good and the lighting agent was not yet necessary. The additive used in the test contained:

60 percentages of weight base material comprising as an organic substance biomass, the ashless dry content of which was: 11,8 percentages of weight amino acids consisting of, as calculated from the total amount of nitgrogen with the nitrogen number 6,25, glycine 1,6%, alanine 1,5%, valine 2,9%, leucine 3,7%, isoleucine 2,1%, serine 3,5%, freonine 1,7%, cystsine 2,0%, metionine 0,7%, phenylalanine 3,2%, tyrosine 0,6%, proline 12,7%, asparatine acid 1,3%, glutamine acid 23,0%, lycine 1,1%, arginine 3,9% and histidine 2,5%; 2,1 percentages of weight fatty acids, of which 0,39 percentages of weight oil acid, 1,04 percentages lino-leic acid and 0,54 percentages saturated fatty acids; 85,6 percentages of weight carbohydrates, mostly starch containing in small amounts simple sugar compounds and polymers; and 0,5 percentages of weight mineral substances and trace elements, 20 percentages of weight as oily carrier liquid bronze oil, and 20 percentages of weight a mixture of chalk and lime powders, of which the portion of lime was about 10 percentages of weight.

The additive according to the invention was produced by pouring different material components into an about 10 l vessel and mixing them together as a pastelike ball. Before the welding work was commenced the paste was applied by hand on the weldable seam.

The actual welding was performed by drawing the welding rod in the additive layer along the weldable seam.

During the welding it was observed that the arc ignited rapidly and that the welding rod moved very lightly and no splashing or burning-through of the additive layer was observed.

When the formed slag layer was removed from the weld seam after about 1 minute, the seam was still glowing, the surface of the weld was even and no shape or crack faults could be observed.

The welding seam was X-rayed, whereby the class was obtained as 4 (scale 1 ... 5, of which 5 is the best).

In the additive can be included from the welding technics well-known iron or other compounds, such as mangal, in powder form to enhance for instance the sufficiency, so that it is possible to compensate splashing and burning losses in this way.

As an addition to the primary carbon containing compounds included in the biomass it is possible to use for instance iron oxide, the amount of which is in this case 3 ... 8 percentages of weight.

Magnesium can be used both as a lighting and hydrogen removal agent, whereby the proper amount is 5 ... 20 percentages of weight of the quantity of the base material.

Advantageously as lighting materials can also be used phosphorus, in which case the necessary amount depends on the depth of the welding site and visibility. This amount can even be 20 percentages of weight of the quantity of the base material.

Moreover in the additive it is possible to use aluminium as a thermitic agent promoting the burning, whereby its amount can be depending on circumstances even 50 percentages of weight.

It must be observed that the invention is not restricted to the applications described above, but that many modifications and variations of the additive are possible in the scope of the appended claims. Further it must be noticed that the spreading and guiding equipment of the additive used in the welding can comprise for instance an annular nozzle etc. surrounding the welding rod partially or totally or one or more nozzles or the like located in the vicinity of the welding rod or wire. Moreover the spreading and guiding equipment may comprise a plunger, centrifugal, diaphragm etc. pump or the like, e.g. a screw conveyor. The additive can also be spread simply by hand.

I claim:

1. A paste-like additive for use in arc welding including at least 10 percent by weight of a base material comprising a biomass, said biomass consisting essentially of, in weight percent on an ashless dry basis, 1 to 40 percent amino acids; 0.5 to 10 percent fatty acids; 50 to 98 percent carbohydrates; and up to about 0.5 percent other substances.

2. Additive according to claim 1, characterized in that it contains:
   at least 10 weight percent of an oily carrier liquid mixed with said base material,
   4.5 ... 10 percent amino acids,
   0.5 ... 2 percent fatty acids,
   30 ... 80 percent carbohydrates consisting essentially of carbon compounds with large molecular sizes, and
   0.05 ... 0.5 percent of other substances including mineral substances.

3. Additive according to claim 1 or 2, characterized in that it contains iron, manganese and like compound agents.

4. Additive according to claim 1 or 2, characterized in that it contains as a regulating agent for the pH-value of the additive 10 ... 40, weight percent of one or more of acid lime, chalk powder and common lime.

5. Additive according to claim 1 or 2, characterized in that it contains as a lighting or illuminating agent and as a hydrogen removal agent magnesium in an amount of between 5 ... 20 weight percent.

6. Additive according to claim 1 or 2, characterized in that it contains as a hydrogen removal agent iron oxide in an amount of between 3 ... 8 weight percent.

7. Additive according to claim 1 or 2, characterized in that it contains as a thermitic agent aluminium powder up to 50 weight percent.

8. Additive according to claim 1 or 2, characterized in that said biomass contains as amino acids a nitrogen content of 6.25%; glycine 1.1 ... 2.9%, alanine 1.0 ... 2.7%, valine 2.9 ... 5.2%, leucine 2.5 ... 6.7%, isoleucine 1.4 ... 3.8%, serine 2.4 ... 6.3%, freonine 1.1 ... 3.1%, cystine 1.4 ... 3.6%, metionine 0.4 ... 1.3%, phenylalanine 2.2 ... 5.8%, tyrosine 0.4 ... 1.1%, proline 8.8 ... 22.9%, asparatine acid 0.9 ... 2.4%, glutamine acid 16.1 ... 41.4%, lycine 0.7 ... 2.0%, arginine 2.7 ... 7.1% and histidine 1.7 ... 4.5%.

9. Additive according to claim 1 or 2, characterized in that it contains as fatty acids 0.15 ... 0.49 weight percent saturated fatty acids, 0.10 ... 0.32 weight percent oil acid, 0.28 ... 0.85 weight percent linoleic acid and 0.03 ... 0.11 weight percent linolenic acid.

10. Additive according to claim 1 or 2, characterized in that the carbohydrates include starch and simple sugar compounds and sugar polymers.

11. The additive of claim 2 wherein the oily carrier liquid is bronze oil.

* * * * *